April 4, 1939.   M. O. JOHNSTON ET AL   2,153,254
METHOD AND MEANS OF MEASURING FLUID FLOW
Filed Nov. 20, 1936
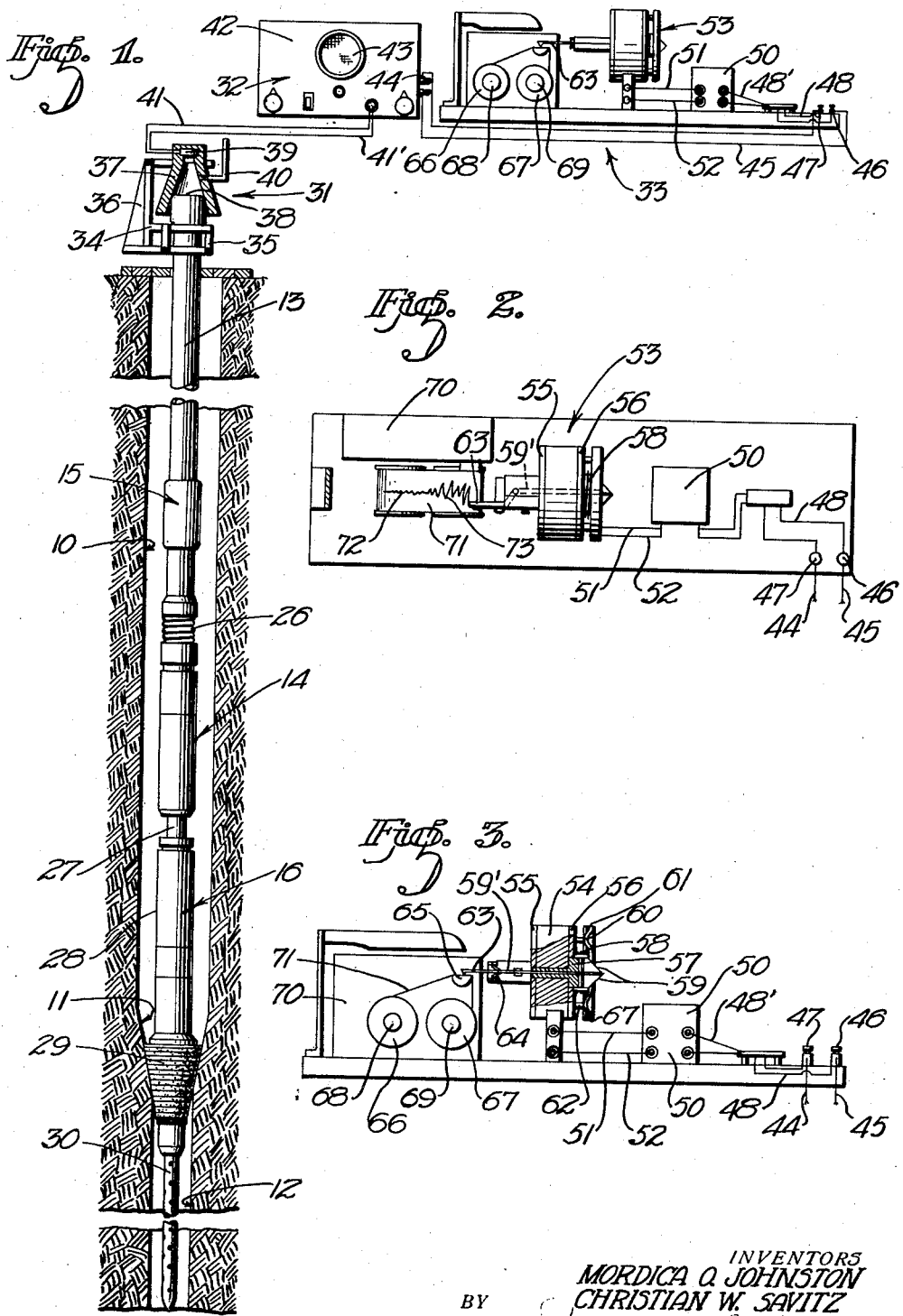
INVENTORS
MORDICA O. JOHNSTON
CHRISTIAN W. SAVITZ
BY James M. Abbett
ATTORNEY Patented Apr. 4, 1939

2,153,254

UNITED STATES PATENT OFFICE 2,153,254

METHOD AND MEANS OF MEASURING FLUID FLOW

Mordica O. Johnston and Christian W. Savitz, Glendale, Calif.; said Savitz assignor to said Johnston Application November 20, 1936, Serial No. 111,922

4 Claims. (Cl. 73—51)

This invention relates to well testing apparatus, and particularly pertains to a method and means of measuring fluid flow.

In the operation of drilling wells, and particularly oil wells, it is often common practice at present to test the formation being penetrated by packing off a section of the drilled hole so that the pressure of the column of liquid within the well will be excluded from the testing area, after which a flow of fluid is established from the testing area into a drill string through a valved testing tool controlled thereby. In some instances the fluid in the tested area is not liquid, and thus when the valve is closed in the testing tool after it has been opened to establish communication between the testing area and the drill string supporting the tool no liquid will be present as a test sample within the drill string and the tool is withdrawn from the well. It may occur, however, that the formation in the testing area yields gas. It is desirable that this gas be measured or its volume approximately ascertained. Under other conditions it may occur that when the testing tool is manipulated to open its valve the opening operation does not result in opening the valve or subsequently closing it, and there is no certain way of knowing that fluid flow has been established from the testing area through the tool to the packer. It is desirable that this be ascertained, and it is the principal object of the present invention to provide a method and means for ascertaining and measuring the magnitude of flow of fluid established through a testing tool lowered into a well.

The present invention contemplates the provision of an apparatus adapted to be placed in audible communication with the drill string and a testing tool, and which apparatus is equipped with means for receiving the audible sounds incident to the flow of fluid through the testing tool, and recording their magnitude so that the existence of a fluid flow and the approximate volume of fluid flow may be placed on a graphic record.

The invention is illustrated by way of example in the accompanying drawing in which:

Figure 1 is a view in diagram illustrating the application of the present invention to a string of drill pipe and a formation tester.

Fig. 2 is a view in plan showing the recording device with which the present invention is concerned.

Fig. 3 is a view in central vertical section through parts of the recording device, particularly indicating the stylus operating unit.

Referring more particularly to the drawing, 10 indicates a well bore here shown as formed with a tapered shoulder 11 adjacent to its lower end, continuing in a reduced rathole bore 12. Extending into the well is a string of drill pipe 13 carrying a testing tool 14 of the type shown and described in the application of Mordica O. Johnston, one of the applicants herein bearing Serial No. 726,583, filed May 19, 1934, and entitled Well testing method and apparatus therefor. Mounted above the tester 14 is a trip valve structure 15 and below the tester 14 is an equalizing valve structure 16. The trip valve structure comprises a valve element which is normally held in a locked position and which is released and opened by the action of a go-devil dropped through the drill string and striking an impact member. The testing tool is formed with a valve seat carried by a sleeve and within which sleeve a tubular mandrel reciprocates, the mandrel carrying a valve member which cooperates with the seat to normally close the tool under action of the spring 26. The equalizer valve comprises the tubular mandrel 27 extending into the sleeve 28 and having a valve structure therein so that when the mandrel and the sleeve are in their extended position with each other the valve will be closed, and when they are in their collapsed position the valve will establish a flow of fluid through the sleeve 28 and a rathole packer 29 carried thereby, and to and from the perforated nipple 30. It will be understood that the foregoing description of the testing tool and its various valves is made by way of example, and that the present invention is equally applicable to use with any other type of flow device in connection with which it is desired to ascertain the existence of magnitude of flow of fluid.

The invention is particularly concerned with a sound receiving and recording device which is responsive to sound vibrations produced by the inflow of fluid to the drill string through the valves of a testing apparatus. This structure includes a sound pickup unit 31 adapted to be fitted over the upper opened end of the drill string, a sound amplifying unit 32 connected therewith, and a recording unit 33. The sound pickup unit comprises a bracketlike mounting 34 which may be secured upon the upper end of the drill string by a clamping collar 35. This bracket carries a standard 36 by which a dome member 37 is supported. The dome member 37 has a downwardly and outwardly flaring mouth which fits over the opened end 38 of the drill string. The upper end of the dome 37 is closed and carries a microphone 39. Extending through the side wall of the dome is a fluid vent pipe 40, for a purpose to be hereinafter described. The microphone connects with the sound amplifying unit 32 by conductors 41 and 41'. This unit has the usual control panel 42 and includes a loud speaker 43. The electrical apparatus embodied in the unit is that commonly used in connection with radio loud speakers and may be of any desired and conventional construction. Output wires 44 and 45 are connected with the unit 32 and lead to binding posts 46 and 47. These are connected with conductors 48 and 48' which lead to an input transformer 50. Conductors 51 and 52 are connected with the input transformer and lead to a stylus actuating device 53. This device includes a permanent magnet having a winding 54 and end plates 55 and 56. A soft iron core 57 extends through the magnet and is formed with an enlarged head at its rear end which is circumscribed by a small energizing coil 58 carrying supporting wires 59. The core 57 is fixed within the permanent magnet and the coil 58 is at the end thereof. This magnet arrangement is substantially the same as that used in the ordinary loud-speaker and has been adapted for the present purposes. The wires 59 are provided to support the end of a non-metallic rod 59' and when a current impulse is produced and delivered from the output wires of the transformer 50, the current value will be changed in the coil 58 to appropriately reciprocate the element 59'. These wires form a frame mounted upon a diaphragm 60 disposed upon a felt washer 61, which diaphragm is corrugated and is secured by fastenings 62 to the plate 56 of the magnet. A non-metallic rod 59' is attached at its rear end to the wire support 59 and extends freely through a central opening in the core. The forward end of the non-metallic rod is attached to a stylus 63 which is supported by a guide 64 and overhangs a platen 65. As shown in Figure 2 of the drawing, the stylus is formed as a part of a bell-crank lever, the end of which is attached to the rod 59', so that the stylus will swing laterally of the platen and inscribe a laterally disposed curve of a magnitude comparable with the amplitude of the sound received by the set, as clearly shown on the ribbon in Figure 2 of the drawing. A pair of winding spools 66 and 67 are mounted upon axles 68 and 69, respectively, which axles are carried by the housing 70 within which a time clock mechanism is enclosed. A chart ribbon 71 is led from one of the winding spools to the other and is led over the platen 65. The point of the stylus 63 rests upon the portion of the ribbon being drawn across the platen and thus receives a graph mark indicating the volume of intensity of sound which has been picked up by the microphone 39 and carried through the apparatus as an electrical impulse.

In operation of the present invention the testing tool is lowered into the well with the main valve of the tool 14 and the valve of the trip valve structure closed. The packer 29 is properly seated on the seat 11 and thus fluid in the main well bore 10 is shut off from the fluid within the rathole 12. The weight of the drill stem is then imposed upon the main valve structure of the testing tool 14 to compress the spring 26 and to open the main valve. A go-devil (not illustrated) may then be dropped into the well and immediately after it is dropped the sound pick up unit may be placed in position over the mouth of the drill string. The electrical apparatus including the units 32 and 33 are in proper electrical connection with the sound pick-up unit and the clock mechanism 70 is in operation. At this time the stylus 63 is resting upon the ribbon 71 and due to the fact that there is a relatively small amount of sound vibration taking place within the tool a relatively straight line as indicated at 72 will be marked upon the ribbon 71. When the go-devil 20 strikes the trip valve and opens it there will be an upward surge of fluid through the packer 29, the testing unit 14, and the trip valve 15. This upward surge of fluid will produce an appreciable amount of noise and at the same time it will displace the air which is within the drill stem. This air will pass outwardly through the vent pipe 40 and the flow will be accompanied by a sound in direct proportion to the volume of air which is being forced through the vent pipe. The result will be that the increased amplitude of the waves will be marked upon the ribbon 71 as indicated at 73. This will indicate that a flow of fluid has been established through the testing tool to the area below the packer, and will furthermore in a desirable manner indicate the magnitude of this flow on the ribbon. Thus a definite graph will be obtained proving that flow has been established through the tool, and further proving the relative fluid pressure created within the drill string, whether it be caused by liquid in displacing the air or by gas in the event the formation does not yield liquid.

It will thus be seen that the structure here disclosed provides means whereby fluid flow conditions within a well may be ascertained, and further provides a method whereby this may be accomplished quickly, accurately, and with a permanent record.

While we have shown the preferred form of method and means of measuring the flow of fluid within a well, it will be understood that various changes might be made in the steps of the method, and in the construction of the device embodying the invention, by those skilled in the art, without departing from the spirit of the invention as claimed.

Having thus described our invention, what we claim and desire to secure by Letters Patent is:

1. A device for detecting the flow of fluid within a conduit by the sound vibrations set up by the fluid as it flows through the conduit which comprises a dome member, means for detachably securing said dome member over the opened end of the conduit, a fluid vent formed through the wall of said dome, a microphone mounted within the dome and disposed in the path of travel of sound waves propagated by said sound vibrations whereby electrical sound impulses will be created within the microphone, means for electrically amplifying said impulses, a stylus, actuating means therefor responsive to said amplified electrical impulses, a recording ribbon upon which a graph may be marked by said stylus, and means for moving said recording ribbon with relation to the stylus at a uniform rate of speed.

2. A device for detecting the flow of fluid within a conduit by the sound vibrations set up by the fluid as it flows through the conduit which comprises a dome member, means for detachably securing said dome member over the opened end of the conduit, a microphone mounted within the dome and disposed in the path of travel of sound waves propagated by said sound vibrations whereby electrical sound impulses will be created within the microphone, means for electrically amplifying said impulses, a stylus, actuating means therefor responsive to said amplified electrical impulses, a recording ribbon upon which a graph may be marked by said stylus, and means for moving said recording ribbon with relation to the stylus at a uniform rate of speed.

3. A device for detecting the flow of fluid within a conduit by the sound vibrations set up by the fluid as it flows through the conduit which comprises a dome member, a microphone mounted within the dome and disposed in the path of travel of sound waves propagated by said sound vibrations whereby electrical sound impulses will be created within the microphone, means for electrically amplifying said impulses, a stylus, actuating means therefor responsive to said amplified electrical impulses, a recording ribbon upon which a graph may be marked by said stylus, and means for moving said recording ribbon with relation to the stylus at a uniform rate of speed.

4. A method of determining at the top of the well, the fluid flow condition at the bottom of the well during a well test, which consists in lowering a testing device including a valve and a packer into the well capable of sealing off a testing area of the well from the remaining well length, setting the packer to seal off a testing area, then opening the valve to permit the flow of fluid from the testing area, then picking up sound waves propagated by said flow of fluid through the valve to the top of the well and amplifying the same to detect the degree of flow of the fluid flowing through the valve at the bottom of the well.

MORDICA O. JOHNSTON.
CHRISTIAN W. SAVITZ.